Jan. 12, 1960 L. J. DYKSTRA ET AL 2,921,112
ELECTRIC CONDUCTOR STRAND SEPARATOR INSULATOR
Filed Sept. 15, 1958 3 Sheets-Sheet 1

LAURENCE J. DYKSTRA
LEE J. GRILLS
INVENTORS

BY Harold E. Stonebraker,
ATTORNEY

Jan. 12, 1960   L. J. DYKSTRA ET AL   2,921,112
ELECTRIC CONDUCTOR STRAND SEPARATOR INSULATOR
Filed Sept. 15, 1958   3 Sheets-Sheet 2
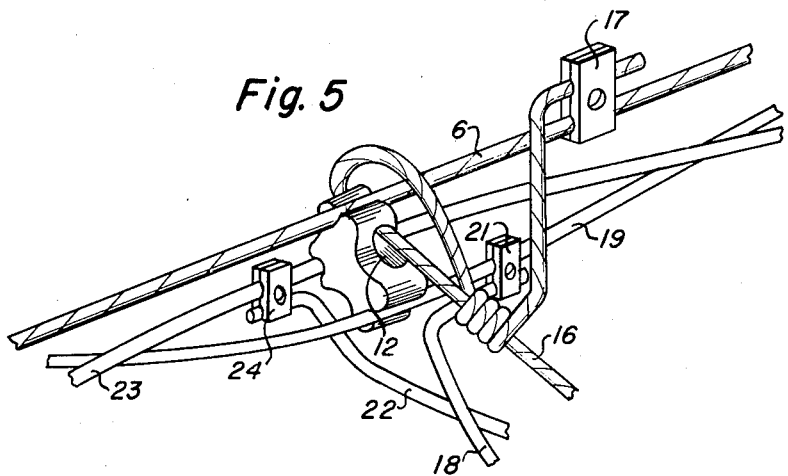
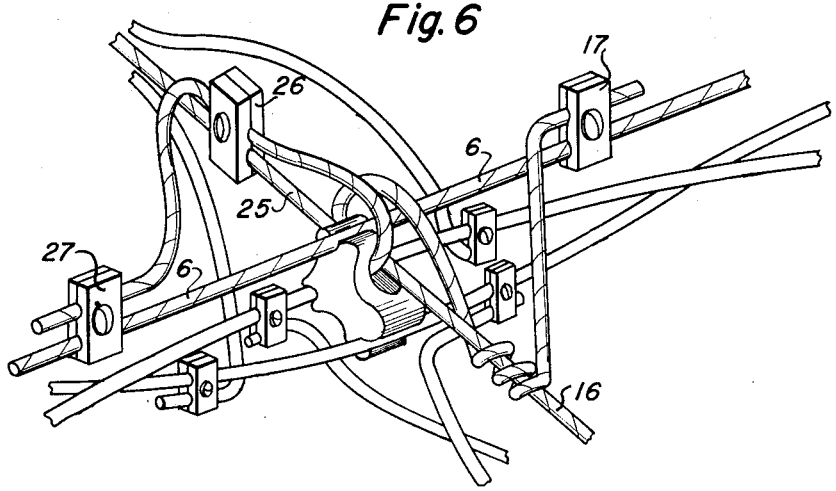
LAURENCE J. DYKSTRA
LEE J. GRILLS
INVENTORS
BY
Harold E. Stonebraker
ATTORNEY Jan. 12, 1960 L. J. DYKSTRA ET AL 2,921,112
ELECTRIC CONDUCTOR STRAND SEPARATOR INSULATOR
Filed Sept. 15, 1958 3 Sheets-Sheet 3

LAURENCE J. DYKSTRA
LEE J. GRILLS
INVENTORS

BY Harold E. Stonebraker
ATTORNEY

United States Patent Office 2,921,112
Patented Jan. 12, 1960

2,921,112

ELECTRIC CONDUCTOR STRAND SEPARATOR INSULATOR

Laurence J. Dykstra and Lee J. Grills, Lima, N.Y., assignors to The Porcelain Insulator Corporation, Lima, N.Y., a corporation of New York Application September 15, 1958, Serial No. 761,042

2 Claims. (Cl. 174—43)

This invention relates to an electric conductor strand separator insulator and has for its purpose to afford an insulator that can be successfully employed to separate and securely maintain in spaced relation the strands or wires of a triplex or quadruplex cable or conductor.

In the distribution of electric power from power lines to individual homes or other places of consumption, it is frequent practice to provide a pole to support each tap or service line from the power line to the home, and it is a purpose of the invention to afford an insulating support, one or more of which can be attached to the power or secondary line and is effective to space the strands or wires at one or more points between adjacent poles so that a tap or service connection can be made from the secondary or power line to several homes or consumer points on one or both sides of the power line and at several points between adjacent poles, thus avoiding the necessity of a pole support for each service tap.

A further purpose is to afford an insulating anchor by which a triplex or quadruplex cable constituting the service tap may be securely fastened to the power line or secondary cable, with the strands of both cables properly spaced.

More particularly the invention has for its purpose to provide a simple and inexpensive construction which can readily be installed, which will sustain the necessary mechanical and electrical loads indefinitely, offering a positive and dependable means whereby the supporting strand of the service tap cable can be permanently attached to the supporting strand of the secondary or power line cable in order to make the required connection to the individual house or consumer point.

Another purpose is to provide an insulator anchor which can be utilized to separate the strands of a secondary or power line, and enable attaching the strands of a tap or service conductor to the secondary or power line at any selected point between poles, thus reducing the number of poles required, and providing a more rigid attachment of the tap or service line to the power line or secondary. To accomplish this, the supporting strand or bare neutral of the tap or service cable is secured to the supporting strand or bare neutral of the secondary or line cable, and extends thence to the dead-end bracket fixed to the house or factory, after which the current carrying conductors or strands of the service tap are connected to the current carrying conductors or strands of the secondary or power line, and it is a particular purpose of the invention to afford a practical and effective separator insulator for spacing the strands, and positive means for economically and permanently fastening the service tap to the secondary or power line, and useful in any relation where it is desirable to separate and space strands of a power line or secondary, and attach thereto spaced strands of a tap or service cable.

To these and other ends the invention consists in the construction and arrangement of parts that will appear clearly from the following description when read in conjunction with the accompanying drawings, the novel features being pointed out in the claims following the specification.

In the drawings:

Fig. 5 is a perspective view showing the application of the invention as shown in Fig. 1 to a secondary or power line, and service tap leading therefrom;

Fig. 6 is a perspective view showing the application of the invention for spacing the strands of a power line as in Fig. 5, and securing taps or service conductors to houses or consumers on both sides of the line and at an intermediate point between adjacent poles;

Figure 1:
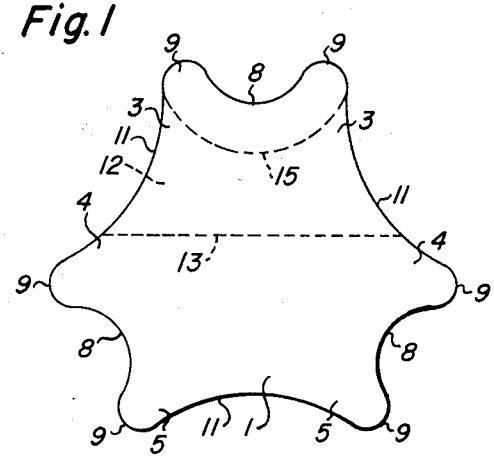
Fig. 1 is a front elevation of a separator insulator for a triplex cable constructed in accordance with a preferred embodiment of the invention.
Figure 2:
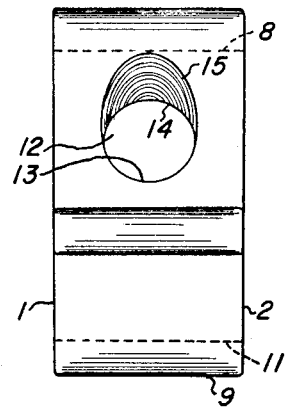
Fig. 2 is a side elevation of the same.

Referring more particularly to the drawings in which like reference numerals refer to the same parts throughout the several views, and to a preferred embodiment of the invention as illustrated in Fig. 1, the structure comprises preferably a wet process porcelain body having opposite parallel flat outer surfaces 1 and 2 between which are arranged the transversely grooved portions 3, 4, and 5, spaced preferably approximately 120° apart around the insulator, and functioning to separate and secure the supporting or messenger cable or strand 6 of the secondary or power line from which service taps are made to houses or other points of consumption, see Figs. 5 and 6. The porcelain body is sufficiently wide to hold it firmly in place between the strands of the cable, see Figs. 5 and 6, and to prevent twisting or slipping.

Each grooved portion has a groove 8 extending transversely of the insulator and defined by convexly curved edges 9 formed at its opposite sides to facilitate inserting the insulator, while adjacent grooved portions are connected by the concavely curved surfaces 11, see Fig. 1.

The porcelain body is supported between the strands of the secondary or line conductor, and in order to fasten and maintain the service tap, which extends from the secondary to the house or service point, the upper grooved portion 3 is provided with an opening 12 extending between the opposite concave surfaces 11 and having a bottom surface 13 that is straight endwise and curved concavely crosswise, while the top surface 14 of the opening 12 is curved concavely crosswise and convexly endwise as at 15, affording curved surfaces around which the supporting strand of the tap or service cable to the house can be bent and secured without coming into contact with any sharp corners or edges, see Fig. 5.

16 designates the supporting strand of the tap or service cable which extends from the secondary or power line to the house or other consumer point, and the strand 16 is extended through the opening 12 in the porcelain body and bent back on and twisted around itself, being then extended and fastened to the supporting strand of the secondary or power line cable 6 and secured thereto by the clamp 17. Following this, the conductor 18 of the tap or service cable is connected to conductor 19 of the secondary or line cable by clamp 21, and conductor 22 of the tap cable is connected to conductor 23 of the secondary or line cable by clamp 24.

Fig. 6 shows an adaptation where the secondary or line cable is connected to two houses or consumer points by an additional supporting strand of a tap cable on the opposite side from that already described, the supporting strand 25 of the second tap cable being extended through the opening 12 in the insulator as previously described, being then bent around and over the top of the latter and secured to itself by the clamp 26, and extending thence to the supporting strand 6 of the secondary or power line to which it is attached by clamp 27. The supporting strand 16 in Fig. 6 is twisted around itself after passing through the insulator and attached to the supporting strand 6 by clamp 17 as already described and shown in Fig. 5.

In applying the spacing and supporting insulator, the strands of a conductor cable are separated by any suitable instrument at the point where a tap connection is to be made, and forced apart sufficiently to enable inserting the insulator in the manner shown in Figs. 5 and 6, after which the supporting strands of the service tap or taps are inserted through the opening in the insulator and secured in the manner described.

Figure 3:
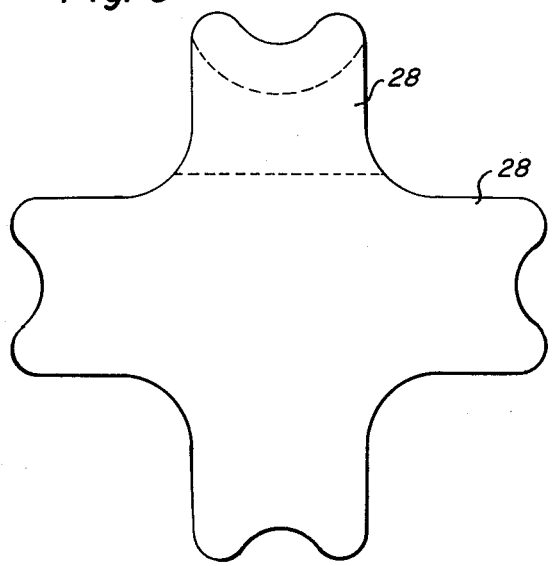
Fig. 3 is a front elevation of a separator insulator for a quadruplex cable, constructed in accordance with the invention.
Figure 4:
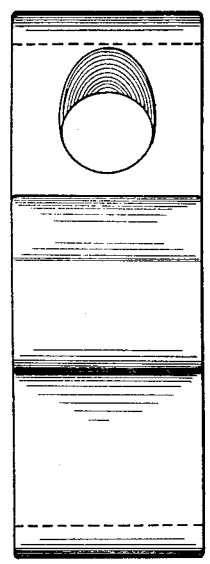
Fig. 4 is a side elevation of the same.

Figs. 3 and 4 disclose the invention as embodied in a spacing and supporting insulator for application to a quadruplex cable in which the grooved portions 28 that receive the strands are located 90° apart instead of 120° as in the triplex unit.

Figure 7:
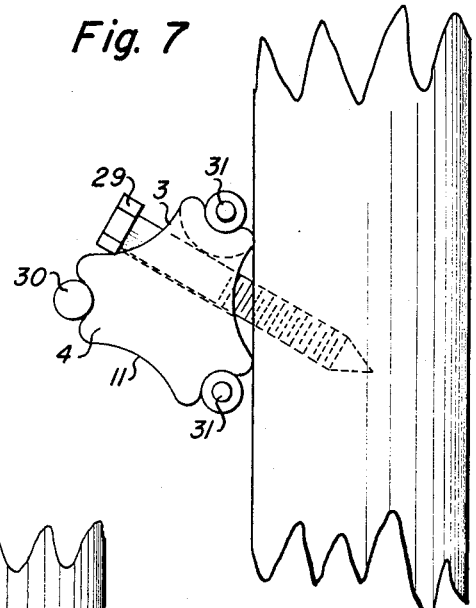
Fig. 7 is a view in side elevation illustrating the application of the invention when attached to a pole for separating and supporting the strands of a triplex cable.
Figure 8:
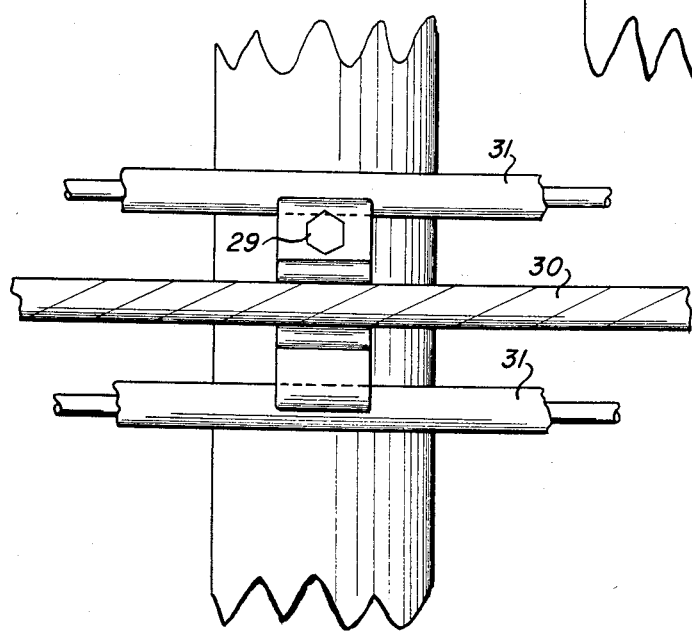
Fig. 8 is a front elevation of the same.

Fig. 7 shows the application of the spacing and supporting insulator direct to a pole where it is desired to space the strands of the line or secondary cable and fasten them at such point to a pole. The invention is here illustrated as embodied in a structure for supporting a triplex cable and is attached to the pole by a lag-screw 29 that is inserted through the opening in the insulator and forced into the wooden pole. When applied in this relation, the insulator spaces and retains the three strands of the power line cable or secondary, including the steel messenger or supporting strand 30 and conductors 31.

While the invention has been described with reference to the structure herein shown, it is not confined to the details or particular applications herein disclosed, and this application is intended to cover such modifications or changes as may come within the purposes of the improvement or the scope of the following claims.

We claim:

1. A multiplex cable connection comprising a cable assembly including a plurality of secondary cables and a supporting ground cable, a porcelain insulator having spaced outer opposite side surfaces and a series of uniformly spaced grooved portions each of which has a groove extending transversely between said side surfaces and operating to receive a cable of said cable assembly, each of said transverse grooves being defined by convexly curved rounded outer edges, one of said grooved portions having an opening extending between said side surfaces perpendicularly of its groove and located between its groove and the adjacent grooved portions, said opening defined by a bottom surface that is straight endwise and curved concavely crosswise of the opening and by a top surface that is curved concavely crosswise and convexly endwise of the opening, said convexly curved top surface of the opening merging at its ends into the rounded edges of the adjacent transverse groove, the supporting ground cable of said cable assembly being located in the groove which is above said opening and perpendicular thereto and the secondary cables of said cable assembly being located in the other grooves of the insulator, all of the cables of the cable assembly being spaced from each other by the insulator, a service cable comprising a supporting strand and conductors, the supporting strand of a service cable extending through said opening in the insulator and bending around and over the ground cable of said cable assembly and being bent thence upon and attached to itself at a point from which said supporting strand of the service cable extends to and is electrically connected to the ground cable of said cable assembly, the conductors of the service cable being electrically connected to the secondary cables of said cable assembly, the porcelain insulator being sufficiently wide between its side surfaces to hold the insulator in place between the cables of the cable assembly without twisting or slipping endwise of the cables, and acting to hold the several cables firmly and sufficiently spaced from each other to avoid the necessity of insulation wrappings around the points of connection between the conductors of the service cable and the secondary cables of the said cable assembly.

2. A multiplex cable connection comprising a cable assembly including a plurality of secondary cables and a supporting ground cable, a porcelain insulator having spaced outer opposite side surfaces and a series of uniformly spaced grooved portions each of which has a groove extending transversely between said side surfaces and operating to receive a cable of said cable assembly, each of said transverse grooves being defined by convexly curved rounded outer edges, one of said grooved portions having an opening extending between said side surfaces perpendicularly of its groove and located between its groove and the adjacent grooved portions, said opening being defined by a bottom surface that is straight endwise and curved concavely crosswise of the opening and by a top surface that is curved concavely crosswise and convexly endwise of the opening, said convexly curved top surface of the opening merging at its ends into the rounded edges of the adjacent transverse groove, the supporting ground cable of said cable assembly being located in the groove which is above said opening and perpendicular thereto and the secondary cables of said cable assembly being located in the other grooves of the insulator, all of the cables of the cable assembly being spaced from each other by the insulator a service cable comprising a supporting strand and conductors, the supporting strand of a service cable extending through said opening in the insulator and bending around and over the ground cable of said cable assembly and being thence attached to the said supporting strand and electrically connected to the ground cable of said cable assembly, the conductors of the service cable being electrically connected to the secondary cables of said cable assembly at points spaced substantially from each other and from the supporting ground cable of the cable assembly, said porcelain insulator being sufficiently wide between its side surface to hold the insulator in place between the cables of the cable assembly without twisting or slipping endwise of said cables.

References Cited in the file of this patent

UNITED STATES PATENTS

| 545,819 | Rothenberger | Sept. 3, 1895 |
| 1,553,244 | Jacobs | Sept. 8, 1925 |
| 1,720,181 | Kyle | July 9, 1929 |
| 1,856,109 | Murray | May 3, 1932 |
| 2,165,087 | Alford | July 4, 1939 |
| 2,887,524 | Fulps | May 19, 1959 |

FOREIGN PATENTS

| 1,774 | Great Britain | 1882 |

OTHER REFERENCES

Siemens and Halske, 1,003,303, Feb. 28, 1957 (German printed application).